US006988321B2

(12) United States Patent
Ueno et al.

(10) Patent No.: US 6,988,321 B2
(45) Date of Patent: Jan. 24, 2006

(54) ELECTROSTATIC CAPACITANCE TILT ANGLE SENSOR

(75) Inventors: Hiroshi Ueno, Aichi (JP); Tadashi Hattori, 8-15-6-202, Tsujii, Himeji-shi, Hyogo 670-0083 (JP)

(73) Assignees: Kabushiki Kaisha Tokai Rika Denki Seisakusho, Aichi (JP); Tadashi Hattori, Hyogo (JP)

( * ) Notice: Subject to any disclaimer, the term of this patent is extended or adjusted under 35 U.S.C. 154(b) by 0 days.

(21) Appl. No.: 10/976,184

(22) Filed: Oct. 28, 2004

(65) Prior Publication Data

US 2005/0144794 A1   Jul. 7, 2005

(30) Foreign Application Priority Data

Oct. 31, 2003 (JP) .............................. 2003-371616
Jun. 24, 2004 (JP) .............................. 2004-186817

(51) Int. Cl.
*G01C 9/06* (2006.01)

(52) U.S. Cl. ................................. 33/366.19; 33/366.11
(58) Field of Classification Search ............ 33/366.11, 33/366.18, 366.19, 1 N, 1 PT, 534
See application file for complete search history.

(56) References Cited

U.S. PATENT DOCUMENTS 3,906,471 A * 9/1975 Shawhan ................. 33/366.11
4,672,753 A * 6/1987 Kent et al. ............... 33/366.19
4,811,491 A * 3/1989 Phillips et al. ........... 33/366.12
5,237,753 A * 8/1993 Carlson et al. ........... 33/366.19
5,428,902 A * 7/1995 Cheah ..................... 33/366.14
5,479,716 A * 1/1996 Murphy ................... 33/366.19
5,630,280 A * 5/1997 Crossan, Jr. ............. 33/366.11
6,449,857 B1 * 9/2002 Anikolenko ............. 33/366.11
6,618,951 B2 * 9/2003 Mercer et al. ........... 33/366.15
6,725,554 B1 * 4/2004 Gersak .................... 33/366.15
2001/0045019 A1 * 11/2001 Takeuchi et al. ......... 33/366.19
2003/0000095 A1 * 1/2003 Takeuchi et al. ......... 33/366.19

FOREIGN PATENT DOCUMENTS

JP           8-261757         10/1996

* cited by examiner

*Primary Examiner*—G. Bradley Bennett
(74) *Attorney, Agent, or Firm*—Patterson, Thuente, Skaar & Christensen, P.A.

(57) ABSTRACT

An electrostatic capacitance tilt angle sensor having a size that is reduced without lowering detection capacity. The sensor is provided with a case including a first wall and a second wall facing each other. A common electrode is arranged on the first wall and a differential electrode is arranged on the second wall. A liquid electrostatic capacitance medium is accommodated in the case and contacts the common electrode and the differential electrode. The electrostatic capacitance medium includes an insulative liquid base and fine particles mixed in the base. The fine particles have a dielectric constant that is higher than that of the base.

20 Claims, 8 Drawing Sheets

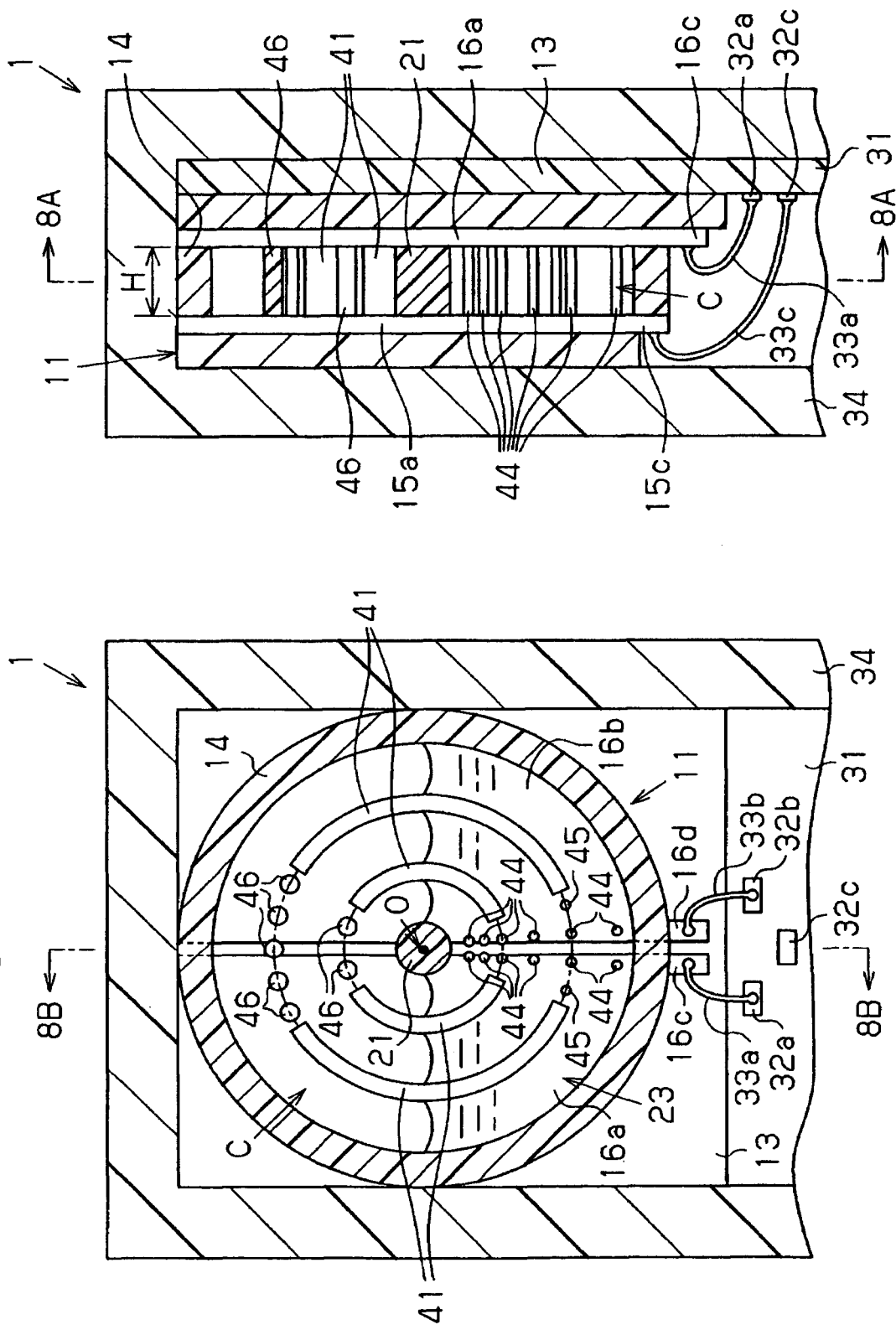

ELECTROSTATIC CAPACITANCE TILT ANGLE SENSOR

BACKGROUND OF THE INVENTION

The present invention relates to sensors, more specifically to an electrostatic capacitance tilt angle sensor, installed in a measuring instrument or a vehicle to detect the tilt angle.

Japanese Laid-Open Patent Publication No. 08-261757 describes a prior art example of an electrostatic capacitance tilt angle sensor. The electrostatic capacitance tilt angle sensor includes an oil case, a liquid electrostatic capacitance medium contained in the oil case, and two differential electrodes and two common electrodes arranged in the oil case. The parts of the two differential electrodes and the two common electrodes immersed in the electrostatic capacitance medium each configure two capacitors. When the electrostatic capacitance tilt angle sensor is in a horizontal state, the parts of each differential electrode immersed in the electrostatic capacitance medium have substantially the same area (immersed area). Thus, the capacitors have substantially the same electrostatic capacitances. When the electrostatic capacitance tilt angle sensor is tilted, the immersed area of one of the differential electrode increases and the immersed area of the other one of the differential electrodes decreases. This produces a difference between the electrostatic capacitances of the capacitors. The electrostatic capacitance tilt angle sensor calculates the tilt angle based on the difference between the electrostatic capacitances.

The conventional electrostatic capacitance tilt angle sensor has a volume of several cubic centimeters to more than a hundred cubic centimeters and is thus relatively large. There has been a recent demand for a smaller electrostatic capacitance tilt angle sensor that occupies less space. However, when the electrostatic capacitance tilt angle sensor is simply made smaller, the detection reliability and detection resolution fall due to the decrease in electrostatic capacitance and the influence of the surface tension of the electrostatic capacitance medium on the inner wall surface of the oil case.

SUMMARY OF THE INVENTION

The present invention provides a compact electrostatic capacitance tilt angle sensor without lowering the capacity of the sensor.

One aspect of the present invention provides a sensor for detecting tilt angle. The sensor is provided with a case including a first wall and a second wall facing each other. A common electrode is arranged on the first wall. A differential electrode is arranged on the second wall. A liquid electrostatic capacitance medium is accommodated in the case contacting the common electrode and the differential electrode. The electrostatic capacitance medium includes an insulative liquid base and fine particles that are mixed in the base and have a higher dielectric constant than the base.

A further aspect of the present invention is a sensor for detecting tilt angle. The sensor is provided with a case including a first wall and a second wall, which face each other, and a central portion. A common electrode is arranged on the first wall. A differential electrode is arranged on the second wall. A liquid electrostatic capacitance medium is accommodated in the case contacting the common electrode and the differential electrode. A projection is arranged on at least one of the common electrode and the differential electrode in at least the vicinity of the central portion of the case.

Another aspect of the present invention is a sensor for detecting tilt angle. The sensor is provided with a case including a first wall and a second wall, which face each other, and a central portion. A common electrode is arranged on the first wall. A differential electrode is arranged on the second wall. A liquid electrostatic capacitance medium is accommodated in the case contacting the common electrode and the differential electrode. A cylindrical first boss is arranged in the central portion of the case. A plurality of second bosses are arranged symmetrically with respect to the center of the case about the first boss.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which:

FIG. 8A is a partial cross sectional front view showing part of an electrostatic capacitance tilt angle sensor according to a second embodiment of the present invention;

FIG. 8B is a partial cross sectional side view showing the electrostatic capacitance tilt angle sensor of FIG. 8A;

DETAILED DESCRIPTION OF THE PREFERRED EMBODIMENTS

Figure 1:
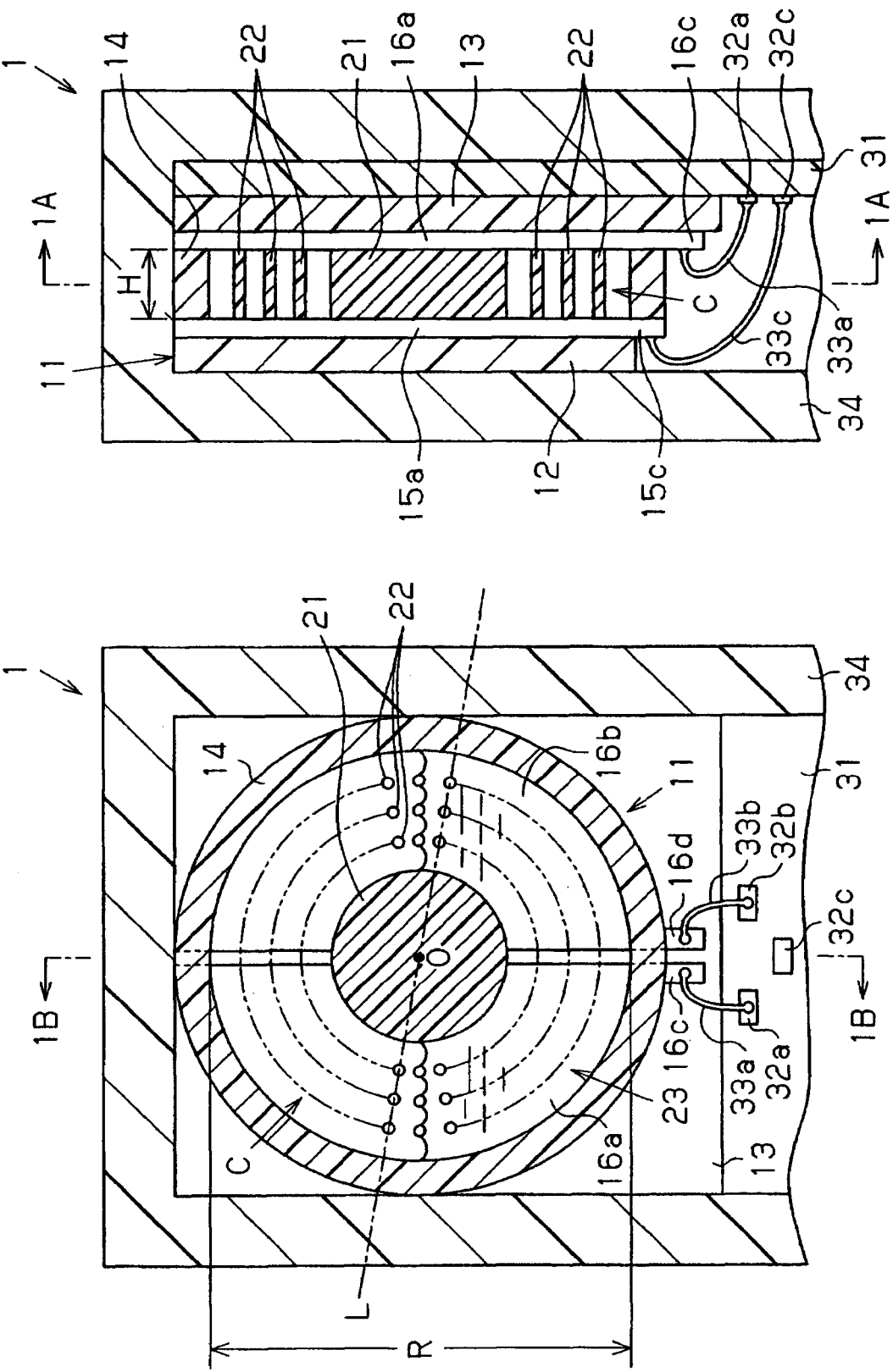
FIG. 1A is a partial cross sectional front view showing an electrostatic capacitance tilt angle sensor according to a first embodiment of the present invention.
FIG. 1B is a partial cross sectional side view showing the electrostatic capacitance tilt angle sensor of FIG. 1A.

In the drawings, like numerals are used for like elements throughout.

(First Embodiment)

An electrostatic capacitance tilt angle sensor 1 according to a first embodiment of the present invention will now be described in detail with reference to FIGS. 1A to 7.

FIG. 1A is a partial cross sectional front view showing the electrostatic capacitance tilt angle sensor (hereinafter referred simply as "tilt angle sensor") 1 of the first embodiment. FIG. 1B is a partial cross sectional side view of the tilt angle sensor 1. The cross sectional position in FIG. 1B is taken along line 1B—1B in FIG. 1A, and the cross sectional position in FIG. 1A is taken along line 1A—1A in FIG. 1B.

As shown in FIG. 1A and 1B, the tilt angle sensor 1 includes a case 11. The case 11 includes a first wall 12, a second wall 13, and a third wall 14, which are made of synthetic resin. As shown in FIG. 1B, the first wall 12 and the second wall 13 are arranged facing each other, and the third wall 14 is arranged between the first wall 12 and the second wall 13. The first wall 12 and the second wall 13 are plates having sides with lengths of approximately four to six millimeters.

Figure 2:
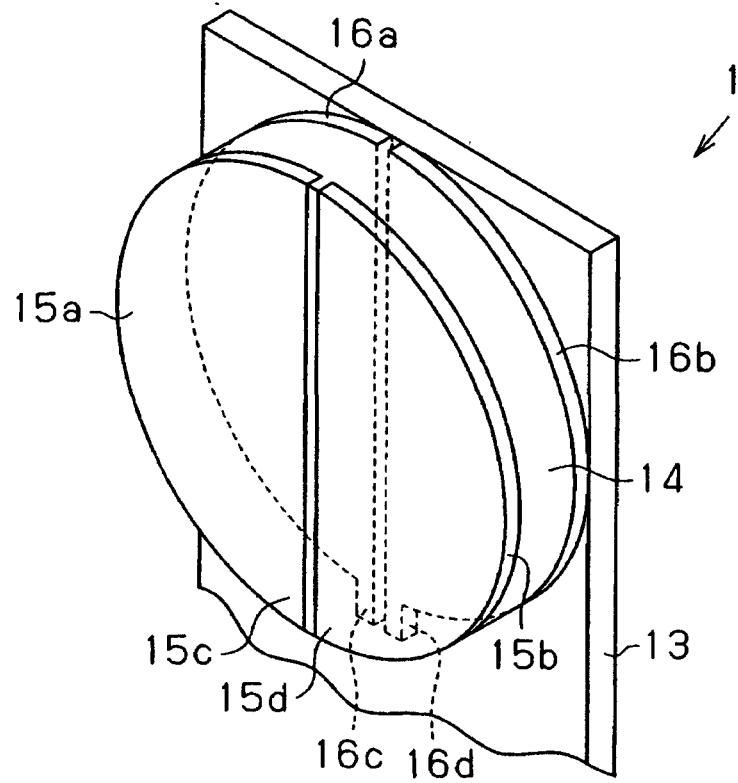
FIG. 2 is a perspective view showing common electrodes and differential electrodes included in the electrostatic capacitance tilt angle sensor of FIG. 1A.

As shown in FIG. 1B and FIG. 2, common electrodes 15a and 15b are arranged on the surface of the first wall 12 facing the second wall 13. Differential electrodes 16a and 16b are arranged on the surface of the second wall 13 facing the first wall 12. The common electrodes 15a and 15b and the differential electrodes 16a and 16b are each substantially semicircular. The common electrode 15a faces towards the differential electrode 16a. The common electrode 15b faces towards the differential electrode 16b. The electrodes 15a, 15b, 16a, and 16b are formed through processing techniques such as, hot embossment processing, printing, and vapor deposition. Further, as shown in FIGS. 1A, 1B, and 2, terminals 15c and 15d are defined on the common electrodes 15a, 15b, respectively. Terminals 16c and 16d are formed on the differential electrodes 16a and 16b, respectively.

The third wall 14 is annular and arranged between the common electrodes 15a and 15b and the differential electrodes 16a and 16b. The periphery of the third wall 14 is flush with the peripheries of the common electrodes 15a and 15b and the differential electrodes 16a and 16b. The third wall 14 is formed so that a predetermined distance H (30 to 40 µm in the first embodiment) is provided from the common electrodes 15a and 15b to the differential electrodes 16a and 16b. Further, referring to FIG. 1A, the third wall 14 has an inner diameter R of about 3 to 5 mm. The case 11 is cylindrical. An accommodating space C is defined in the case 11.

Figure 7:
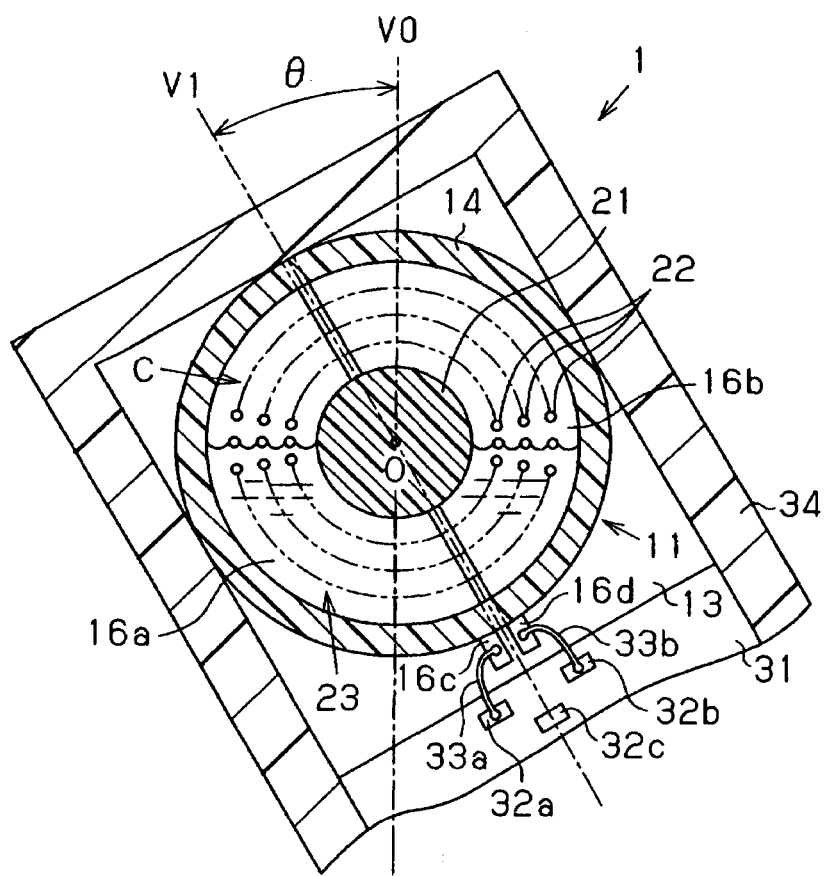
FIG. 7 is a front view showing a tilted state of the electrostatic capacitance tilt angle sensor of FIG. 1A.

A first boss 21 (projection), which is cylindrical, is arranged at the central portion of the accommodating space C. The axis of the first boss 21 lies along the axis O of the accommodating space C. A first end face of the first boss 21 is connected to the common electrodes 15a and 15b. In other words, the first end face of the first boss 21 is indirectly connected to the inner surface of the first wall 12 facing the second wall 13 by the common electrodes 15a and 15b. The second end face of the first boss 21 is connected to the differential electrodes 16a and 16b. In other words, the second end face of the first boss 21 is indirectly connected to the inner surface of the second wall 13 facing the first wall 12 by the differential electrodes 16a and 16b. A plurality of equally spaced hypothetic circles that are concentric to the first boss 21 are defined in the space between the peripheral surface of the first boss 21 and the inner surface of the third wall 14 so as to equally divide the space into a plurality of sections (four in the first embodiment). A plurality of second bosses 22 (projections), which are cylindrical and have a diameter smaller than the diameter of the first boss 21, are arranged along the circles. A first end face of each second boss 22 is connected to the common electrodes 15a and 15b. In other words, the first end face of the second boss 22 is indirectly connected to the inner surface of the first wall 12 facing the second wall 13 by the common electrodes 15a and 15b. The second end face of the second boss 22 is connected to the differential electrodes 16a and 16b. In other words, the second end face of the second boss 22 is indirectly connected to the inner wall surface of the second wall 13 facing the first wall 12 by the differential electrodes 16a and 16b. In the first embodiment, the second bosses 22 are equally spaced along each hypothetical circle. Each second boss 22 is arranged so that a line connecting it to the closest second boss 22 of a different circle (e.g., line L shown in FIG. 1A) extends through the axis O. In each circle, the second bosses 22 are arranged at every 1° about the axis O. Therefore, the second bosses 22 are arranged point symmetrically with respect to one another about the axis O. In FIG. 1A and FIG. 7, only some of the second bosses 22 are shown to simplify the drawings.

A liquid electrostatic capacitance medium 23 is accommodated in the accommodating space C. The liquid electrostatic capacitance medium 23 occupies about half of the accommodating space C. Thus, in a state in which the tilt angle sensor 1 is horizontal (state shown in FIG. 1A), the common electrodes 15a and 15b and the differential electrodes 16a and 16b are about half immersed in the electrostatic medium 23. The immersed parts of the electrodes 15a, 15b, 16a, and 16b function as capacitors. More specifically, the parts of the common electrode 15a and the differential electrode 16a immersed in the electrostatic capacitance medium 23 configure a first capacitor. The parts of the common electrode 15b and the differential electrode 16b immersed in the electrostatic capacitance medium 23 configure a second capacitor. When the tilt angle sensor 1 is horizontal, the parts of the common electrode 15a and the differential electrode 16a immersed in the electrostatic capacitance medium 23 have substantially the same area as that of the parts of the common electrode 15b and the differential electrode 16b immersed in the electrostatic capacitance medium 23. Therefore, in this state, the electrostatic capacitances of the first and the second capacitor are substantially the same.

Figure 3:
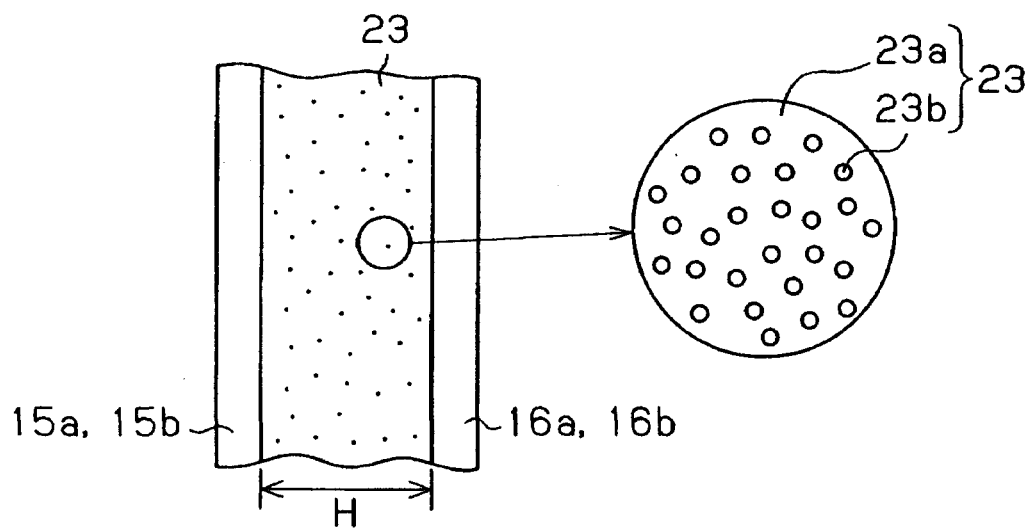
FIG. 3 is an explanatory diagram showing an electrostatic capacitance medium contained in the electrostatic capacitance tilt angle sensor of FIG. 1A in detail.

As shown in FIG. 3, the electrostatic capacitance medium 23 includes a liquid base 23a, which is made of an insulating material (e.g., silicon oil (dielectric constant $\epsilon a=2.7$)), and fine particles 23b, which is made of an insulating material (e.g., barium titanate (dielectric constant $\epsilon b=100$ or greater)) mixed in the base 23a. In the first embodiment, modified silicon oil is used as the base 23a. More specifically, the base 23a is made of reactive silicon oil or non-reactive silicon oil, and has a modified structure of side-chain type, double-end type, single-end type, or side-chain-double-end type. Reactive silicon oil includes amino modified, epoxy modified, carboxyl modified, methacryl modified, mercapto modified, phenol modified, or heterogeneous functional group modified silicon oil. The non-reactive silicon oil includes polyether modified, methyl styryl modified, alkyl-modified, higher fatty acid ester-modified, hydrophilic specially modified, higher alkoxy modified, higher fatty acid containing or fluorine modified silicon oil. The fine particles 23b are nanoparticles having a diameter of several tens of nanometers. The fine particles 23b are mixed in the base 23a and occupy about 10% to 15% of the electrostatic capacitance medium 23. The fine particles 23b are extremely small, and thus perform Brownian motion in the base 23a. The fine particles 23b are thus equally distributed throughout the base 23a. Particularly, since the base 23a is modified silicon oil, the fine particles 23b are easily and equally mixed in the base 23a. The dielectric constant εc of the electrostatic capacitance medium 23 of the first embodiment is approximately 135 and about 50 times of that compared to when the electrostatic capacitance medium 23 includes only of the base 23a.

Figure 4:
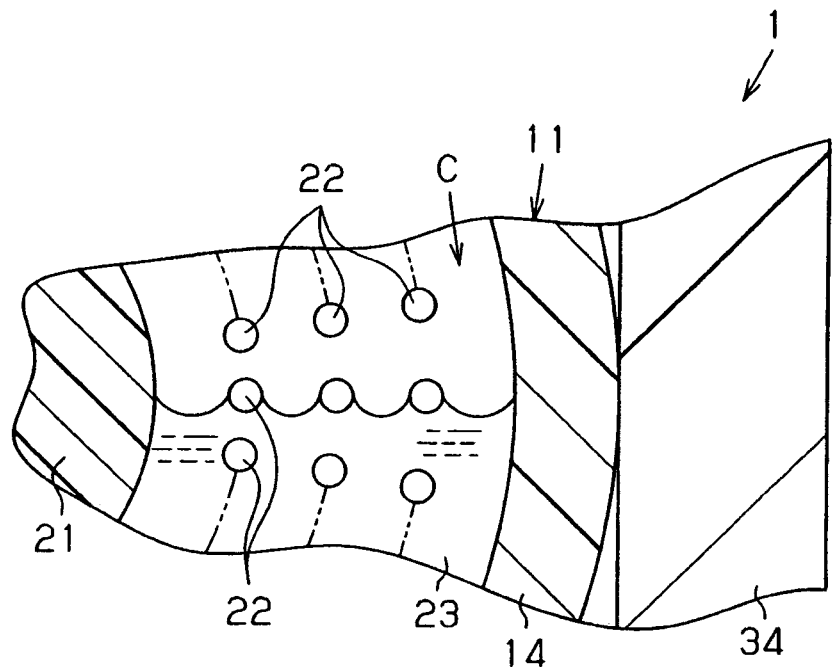
FIG. 4 is a partial front view showing the electrostatic capacitance tilt angle sensor of FIG. 1A.
Figure 5:
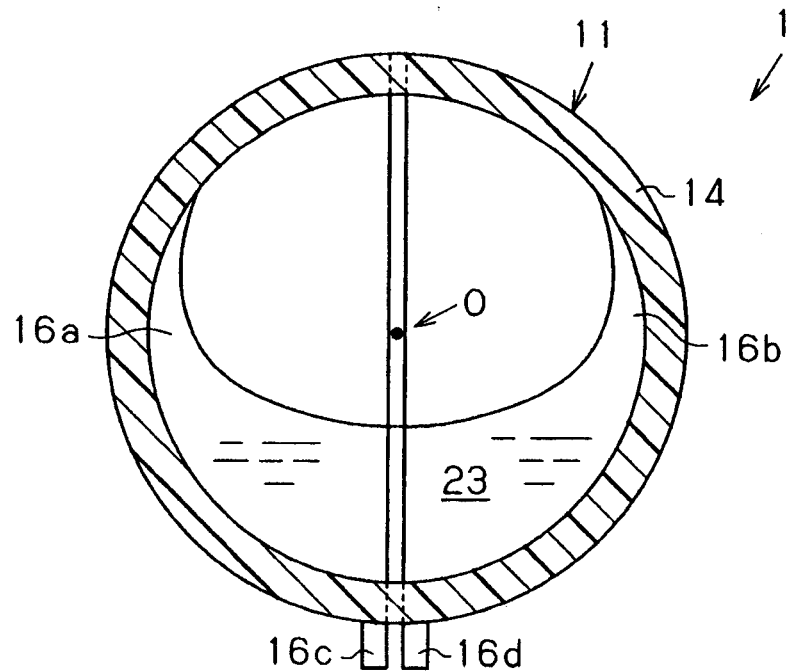
FIG. 5 is a partial cross sectional front view showing the electrostatic capacitance tilt angle sensor serving as a comparative example.

As shown in FIGS. 1A and 4, the surface tension of the liquid level of the electrostatic capacitance medium 23 accommodated in the accommodating space C acts on the inner wall surface of the case 11, the first boss 21, and the second bosses 22 closest to the liquid level. Thus, the liquid level of the electrostatic capacitance medium 23 is substantially horizontal. If, for example, the first boss 21 and the second bosses 22 were not arranged in the accommodating space C, the surface tension of the liquid level of the electrostatic capacitance medium 23 would only act on the inner wall surface of the case 11. The accommodating space C is an extremely small space having an inner diameter R of 3 to 5 mm and a clearance H (predetermined gap) of 30 to 40 μm. Therefore, if the surface tension of the liquid level of the electrostatic capacitance medium 23 were to act only on the inner wall surface of the case 11, the liquid level would not be horizontal due to the surface tension, as shown in FIG. 5. In this case, the change in the difference between the electrostatic capacitance of the first capacitor and the electrostatic capacitance of the second capacitor would not necessarily correspond to changes in the tilt of the tilt angle sensor 1.

As shown in FIG. 1, a processor board 31 is arranged on the outer wall surface of the second wall 13 in the case 11. First to third terminals 32a to 32c are arranged on the surface facing the case 11 of the processor board 31. The first terminal 32a is electrically connected to the terminal 16c of the differential electrode 16a by a wire 33a. The second terminal 32b is electrically connected to the terminal 16d of the differential electrode 16b by a wire 33b. The third terminal 32c is electrically connected to the terminals 15c and 15d of the common electrodes 15a and 15b by a wire 33c.

Figure 6:
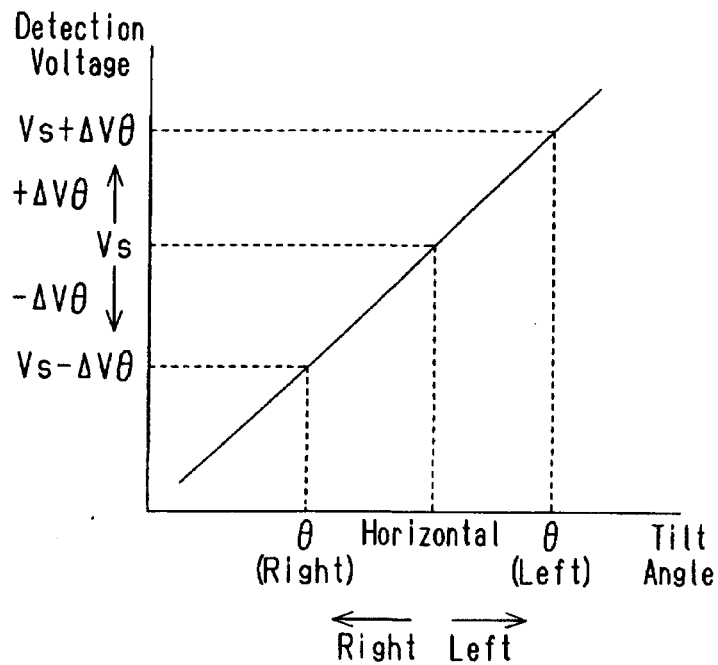
FIG. 6 is an output characteristic graph of the electrostatic capacitance tilt angle sensor of FIG. 1A.

A detection circuit is arranged in the processor board 31 to convert the difference of the electrostatic capacitances of the first and the second capacitor ("electrostatic capacitance of first capacitor"—"electrostatic capacitance of second capacitor") to a voltage difference and externally output a detection voltage $V_{out}$ based on the voltage difference. More specifically, as shown in FIG. 6, the detection circuit outputs a detection voltage $V_{out}$ that is equal to a predetermined reference voltage Vs when the tilt angle sensor 1 is horizontal, that is, when the voltage difference is "0". When the tilt angle sensor 1 is tilted in one direction, for example, the electrostatic capacitance of the first capacitor increases and the electrostatic capacitance of the second capacitor decreases. In this case, the voltage difference is shifted to the positive side, and the detection circuit adds the shifted voltage ΔV to the reference voltage Vs and outputs the detection voltage $V_{out}$ that is equal to voltage Vs+ΔV. Further, when the tilt angle sensor 1 is tilted in the opposite direction, the electrostatic capacitance of the first capacitor decreases and the electrostatic capacitance of the second capacitor increases. In this case, the voltage difference is shifted to the negative side, and the detection circuit subtracts the shifted voltage ΔV from the reference voltage Vs and outputs the detection voltage $V_{out}$ that is equal to voltage Vs−ΔV.

As shown in FIG. 1, the case 11 and the processor board 31 are sealed in a package 34 made of a synthetic resin or ceramic.

The operation of the tilt angle sensor 1 will now be described.

When the tilt angle sensor 1 is held horizontally, the area of the parts of the common electrode 15a and the differential electrode 16a immersed in the electrostatic capacitance medium 23 is substantially the same as the area of the parts of the common electrode 15b and the differential electrode 16b immersed in the electrostatic capacitance medium 23, as mentioned above. Thus, the electrostatic capacitance of the first capacitor and the electrostatic capacitance of the second capacitor are substantially the same, and the voltage difference based on the difference between the electrostatic capacitances of the first and the second capacitors is substantially "0". In this case, the tilt angle sensor 1 outputs a detection voltage $V_{out}$ that is equal to the reference voltage Vs.

As shown in FIG. 7, for example, if the tilt angle sensor 1 is tilted by a predetermined angle θ (in FIG. 7, θ=30°) in the left direction as viewed in FIG. 7 from the horizontal state, the electrostatic capacitance of the first capacitor increases and the electrostatic capacitance of the second capacitor decreases. The difference between the electrostatic capacitance of the first capacitor and the electrostatic capacitance of the second capacitor is thus shifted to the positive side by a shifted amount proportional to the tilt angle θ. The voltage difference based on the difference of the electrostatic capacitances of the two capacitors is thus shifted to the positive side. As a result, the tilt angle sensor 1 outputs a detection voltage $V_{out}$ that is equal to voltage Vs+ΔVθ obtained by adding the shifted voltage ΔVθ, which is proportional to the tilt angle θ, to the reference voltage Vs. If the tilt angle sensor 1 is tilted by a predetermined angle θ in the right direction from the horizontal state, the voltage difference based on the difference of the electrostatic capacitances of the capacitors is shifted to the negative side. As a result, the tilt angle sensor 1 outputs a detection voltage $V_{out}$ equal to voltage Vs−ΔVθ obtained by subtracting the shifted voltage ΔVθ, which is proportional to the tilt angle θ, from the reference voltage Vs.

In this way, the detection voltage $V_{out}$ output from the tilt angle sensor 1 is shifted in accordance with the tilt angle. The tilt angle of the tilt angle sensor 1 is obtained from the detection voltage $V_{out}$. That is, the tilt angle sensor 1 outputs the tilt angle as the detection voltage $V_{out}$.

The tilt angle sensor 1 of the first embodiment has the following advantages.

(1) The electrostatic capacitance medium 23 includes the liquid base 23a and the fine particle 23b, which are mixed in the base 23a, and has a dielectric constant that is about 50 times greater than the dielectric constant of the base 23a. That is, by mixing the fine particles 23b with the base 23a, the dielectric constant of the electrostatic capacitance medium 23 is reliably and easily increased. Thus, the tilt angle sensor 1 is made small but still has a high electrostatic capacitance. Thus, the tilt angle sensor 1 prevents the reliability and resolution of the tilt angle detection from being decreased. Since the dielectric constant of the electrostatic capacitance medium 23 is high, the distance (clearance H) between the common electrodes 15a and 15b and the differential electrodes 16a and 16b may be increased. This decreases the influence of the surface roughness of the electrodes 15a, 15b, 16a, and 16b on the electrostatic capacitance of the tilt angle sensor 1, which, in turn, reduces manufacturing error in the electrostatic capacitance.

(2) The size of the fine particles 23b is set so as enable the Brownian motion to occur in the base 23a. The size of the fine particles 23b is in the scale of nanometers in the first embodiment. This ensures that the fine particles 23b perform Brownian motion in the base 23a. The fine particles 23b are thereby evenly dispersed throughout the base 23a even if an external force for dispersing the fine particles 23b in the base 23a is not applied. Thus, differences in the dielectric constant at different portions of the electrostatic capacitance medium 23 do not occur. This ensures detection reliability of the tilt angle.

(3) The first boss 21 and the second bosses 22 are arranged on the opposing inner wall surfaces of the case 11. Thus, the surface tension of the liquid level of the electrostatic capacitance medium 23 acts on the first and the second bosses 21 and 22. For this reason, even if the case 11 is compact and the volume of the accommodating space C is small, the liquid level of the electrostatic capacitance medium 23 is easily maintained in the horizontal state. Further, the liquid level of the electrostatic capacitance medium 23 remains horizontal even if the tilt angle sensor 1 is tilted. When the tilt angle sensor 1 is tilted, the electrostatic capacitances of the first capacitor and the second capacitor change, and the tilt angle sensor 1 detects the tilt angle based on the change in the electrostatic capacitances. If the bosses 21 and 22 were not arranged in the accommodating space C, the surface tension of the liquid level of the electrostatic capacitance medium 23 would act only on the inner wall surface of the case 11. In this case, if the case 11 were small, the surface tension would curve and deform the liquid level. Thus, the electrostatic capacitances of the first capacitor and the second capacitor would change at a different rate when tilted, and the tilt angle sensor 1 may not output detection voltage that is in correspondence with the tilt angle. However, in the first embodiment, the tilt angle sensor 1 has the bosses 21 and 22 arranged in the accommodating space C. This improves the detection reliability of the tilt angle.

(4) The first boss 21 is arranged at the central portion of the accommodating space C. The second bosses 22 are equally spaced along concentric circles of different diameters about the axis O of the first boss 21. Thus, irrespective of how the tilt angle sensor 1 is tilted, the surface tension of the liquid level of the electrostatic capacitance medium 23 always acts on the bosses 21 and 22.

(Second Embodiment)

A tilt angle sensor 1 according to a second embodiment of the present invention will now be described with reference to FIG. 8A to FIG. 9C.

Figure 9A:
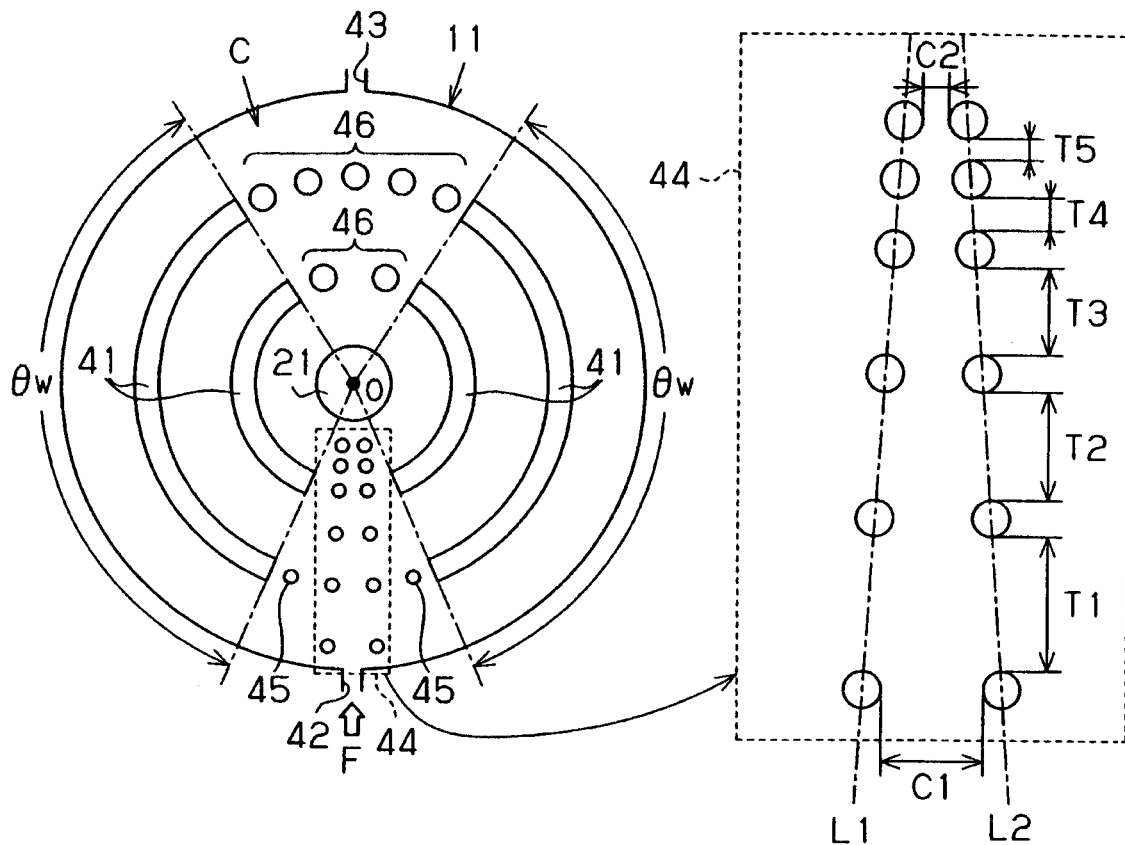
FIGS. 9A to 9C are schematic front views showing the charging of the electrostatic capacitance medium into the electrostatic capacitance tilt angle sensor of FIG. 8A.
Figure 9B:
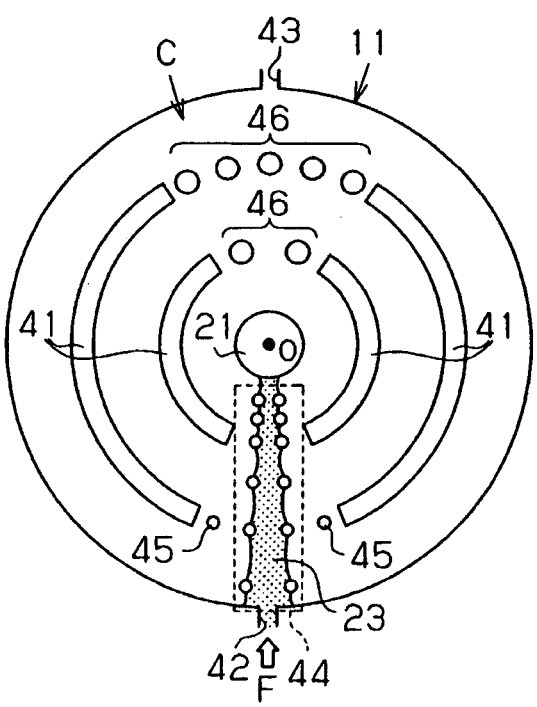
Figure 9C:
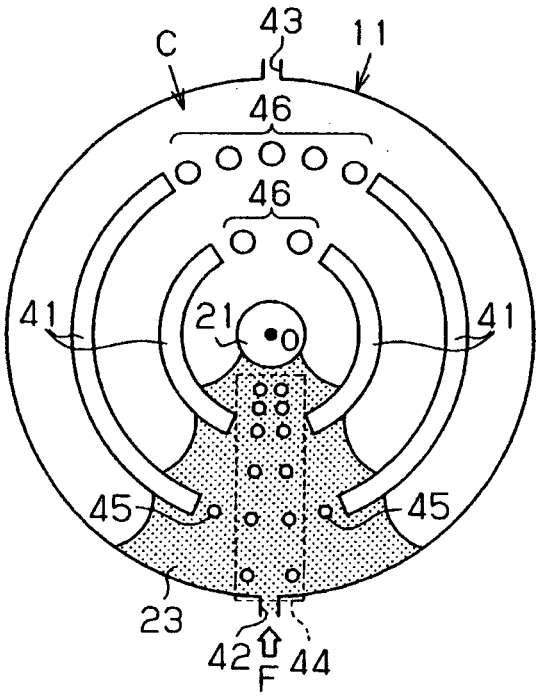

As shown in FIG. 8A to FIG. 9C, in the tilt angle sensor 1 of the second embodiment, the first boss 21 is arranged in the case 11 at the central portion of the accommodating space C in the same manner as the first embodiment. The diameter of the first boss 21 of the second embodiment is smaller than the diameter of the first boss 21 of the first embodiment. Rectifying walls 41 (projections) are arranged along hypothetic circles concentric to the first boss 21 to equally divide the space between the peripheral surface of the first boss 21 and the inner surface of the third wall 14 into a plurality of sections (in this embodiment, three sections). First ends of the rectifying wall 41 are connected to the common electrodes 15a and 15b. In other words, the first ends of the rectifying walls 41 are indirectly connected to the inner surface of the first wall 12 facing the second wall 13 by the common electrodes 15a and 15b. Second ends of the rectifying walls 41 are connected to the differential electrodes 16a and 16b. In other words, the second ends of the rectifying walls 41 are indirectly connected to the inner surface of the second wall 13 facing the first wall 12 by the differential electrodes 16a and 16b. That is, the rectifying walls 41 are coupled to two opposing inner wall surfaces of the case 11. Each rectifying wall 41 extends along an arc of the associated circle. Two rectifying walls 41 are arranged on each circle. More specifically, the rectifying walls 41 formed along the same circuit are symmetrical to each other with respect to line 8B—8B, as shown in FIG. 8A, and extend along arcs of center angle θw, as shown in FIG. 9A. FIGS. 9A to 9C only show elements in the accommodating space C of the case 11 to simplify the drawings.

As shown in FIGS. 9A to 9C, a medium charge port 42 is arranged at the lower part of the case 11, and an air release hole 43 is arranged at the upper part of the case 11. The medium charge port 42 and the air release hole 43 are formed in the third wall 14 that forms the accommodating space C. The electrostatic capacitance medium 23 is charged into the accommodating space C from the medium charge port 42. When the electrostatic capacitance medium 23 is injected, the air in the accommodating space C is released from the air release hole 43.

As shown in FIGS. 8A to 9C, a plurality of medium guides 44 are formed between the first boss 21 and the medium charge port 42 in the accommodating space C. Each medium guide 44 has a cylindrical shape. First ends of the medium guides 44 are connected to the common electrodes 15a and 15b. In other words, the first ends of the medium guide 44 are indirectly connected to the inner surface of the first wall 12 facing the second wall 13 by the common electrodes 15a and 15b. Second ends of the medium guides 44 are connected to the differential electrodes 16a and 16b. In other words, the second ends of the medium guides 44 are indirectly connected to the inner surface of the second wall 13 facing the first wall 12 by the differential electrodes 16a and 16b. Further, the medium guides 44 are arranged along two rows extending from the medium charge port 42 towards the first boss 21. More specifically, as shown in the enlarged view of FIG. 9A, the medium guides 44 are arranged along two lines L1 and L2 extending from the medium charge port 42 to the first boss 21. In the two lines L1 and L2, the distance C1 between the two medium guides 44 closest to the medium charge port 42 is greater than the distance C2 between the two medium guides 44 closest to the first boss 21. That is, the distance between the lines L1, L2 decreases as the first boss 21 becomes closer.

Further, the distance between two adjacent medium guides 44 on each of the lines L1 and L2, or the distance between two adjacent medium guides 44 in the direction from the medium charge port 42 towards the first boss 21, decreases as the first boss 21 becomes closer. As shown in the enlarged view of FIG. 9A, there are twelve medium guides 44 in the second embodiment. In this case, the distances T1 to T5 between two adjacent medium guides 44 in each line L1 or L2 satisfy the relationship of "T1>T2>T3>T4>T5". The distances between adjacent medium guides 44 is set so that the medium guides 44 satisfy the relationship of "sparse→dense" from the medium charge port 42 towards the first boss 21. Further, the distance T1 is narrower than the distance between the rectifying wall 41 and the third wall 14. In the second embodiment, the distance T1 is about twice the diameter of the medium guide 44. The distance T5 is about 0.2 times the diameter of the medium guide 44.

As shown in FIGS. 8A to 9C, third bosses 45, which are cylindrical, are arranged between the medium guides 44 and the rectifying walls 41. A plurality of fourth bosses 46, which are cylindrical, are arranged between the air release hole 43 and the first boss 21 in the accommodating space C. First ends of the third bosses 45 and the fourth bosses 46 are connected to the common electrodes 15a and 15b. In other words, the first ends of the third bosses 45 and the fourth bosses 46 are indirectly connected to the inner surface of the first wall 12 facing the second wall 13 by the common electrodes 15a and 15b. Second ends of the third bosses 45 and the fourth bosses 46 are connected to the differential electrodes 16a and 16b. In other words, the second ends of the third bosses 45 and the fourth bosses 46 are indirectly connected to the inner surface of the second wall 13 facing the first wall 12 by the differential electrodes 16a, 16b. The fourth bosses 46 are arranged at a predetermined interval along the circles that the rectifying walls 41 extend.

The flow of the electrostatic capacitance medium 23 when charged into the case 11 will now be described.

As shown in FIGS. 9A to 9C, the electrostatic capacitance medium 23 is charged through the medium charge port 42 into the accommodating space C of the case 11 in the direction of arrow F (upward). The surface tension of the electrostatic capacitance medium 23 then acts on the medium guides 44 so that, as shown in FIG. 9B, the medium guides 44 guide the electrostatic capacitance medium 23 toward the first boss 21. More specifically, the electrostatic capacitance medium 23 first flows through a flow path (guide path) surrounded by the medium guides 44 and reaches the first boss 21. Subsequently, as shown in FIG. 9C, the electrostatic capacitance medium 23 spreads between the first boss 21 and the inner rectifying wall 41. Then, the electrostatic capacitance medium 23 spreads into the gap between the two rectifying walls 41 and then into the gap between the outer rectifying wall 41 and the third wall 14. Thus, the electrostatic capacitance medium 23 is stably charged into the central portion of the case 11. In addition, the surface tension of the liquid level of the electrostatic capacitance medium 23 acts on the peripheral surface of the first boss 21, the outer surfaces of the rectifying walls 41, and the inner surface of the third wall 14. The liquid level of the electrostatic capacitance medium 23 is thus substantially horizontal, as shown in FIG. 8A.

When the tilt angle sensor 1 is tilted, the electrostatic capacitance medium 23 smoothly moves along the rectifying wall 41. Thus, the liquid level of the electrostatic capacitance medium 23 is constantly maintained in a horizontal state. This ensures that the electrostatic capacitances of the first capacitor and the second capacitor change so that the tilt angle sensor 1 accurately detects the tilt angle based on the change of the electrostatic capacitance. The medium guides 44 are arranged so to satisfy the relationship of "sparse→dense" from the medium charge port 42 towards the first boss 21. Further, when the electrostatic capacitance medium 23 moves within the case 11 as the tilt angle sensor 1 tilts, the medium guides 44 do not inhibit the movement of the electrostatic capacitance medium 23.

Accordingly, the tilt angle sensor 1 of the second embodiment has the following advantages in addition to advantages (1) and (2) of the first embodiment.

(5) The first bosses 21 and the rectifying walls 41 are arranged on the opposing inner wall surfaces of the case 11. Thus, the surface tension of the liquid level of the electrostatic capacitance medium 23 acts on the bosses 21 and the rectifying wall 41. For this reason, even if the case 11 is compact and the volume of the accommodating space C is small, the liquid level is easily maintained in a horizontal state, and the liquid level is reliably maintained in a horizontal state even when the tilt angle sensor 1 is tilted. This ensures that the electrostatic capacitances of the first capacitor and the second capacitor changes when the tilt angle sensor 1 is tilted so that the tilt angle sensor 1 accurately detects the tilt angle based on the change of the electrostatic capacitances. In addition, the electrostatic capacitance medium 23 smoothly moves along the rectifying walls 41 when the tilt angle sensor 1 is tilted. Thus, the tilt angle sensor 1 further reliably detects the tilt angle based on the change of the electrostatic capacitances.

(6) When charged into the case 11, the electrostatic capacitance medium 23 is smoothly guided by the medium guides 44 toward the central portion of the case 11. This ensures the charging of the electrostatic capacitance medium 23 into the case 11.

(7) The distances T1 to T5 between the adjacent medium guide 44 in the direction from the medium charge port 42 towards the first boss 21 decreases as the first boss 21 becomes closer. Thus, even if the electrostatic capacitance medium 23 is charged into the case 11 by a weak charging pressure, the medium guides 44 guide the electrostatic capacitance medium 23 to the central portion of the case 11. Further, when the tilt angle sensor 1 is tilted, the medium guides 44 do not inhibit the movement of the electrostatic capacitance medium 23. This prevents the responsiveness of the detection voltage $V_{out}$, which corresponds to the tilt angle of the tilt angle sensor 1, from being lowered.

It should be apparent to those skilled in the art that the present invention may be embodied in many other specific forms without departing from the spirit or scope of the invention. Particularly, it should be understood that the present invention may be embodied in the following forms.

Figure 10:
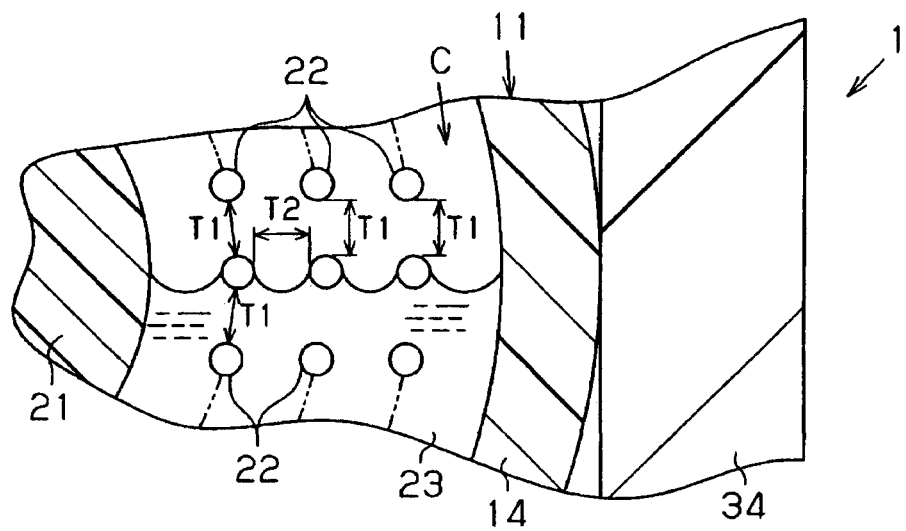
FIG. 10 is an enlarged partial front view showing an electrostatic capacitance tilt angle sensor according to a further embodiment of the present invention.

As shown in FIG. 1A, in the first embodiment, the second bosses 22 are equally spaced along each circle. In addition, the line L connecting the closest second bosses 22 of different circles extends through the axis O. Thus, as also shown in FIG. 4, the distance between adjacent second bosses 22 decreases as the circle on which the second bosses 22 are arranged becomes smaller. However, the second boss 22 does not have to be arranged with such regularity. As shown in FIG. 10, for example, the second bosses 22 may be arranged so that the distance T1 between adjacent second bosses 22 is always the same regardless of the diameter of each circle. The second bosses 22 may also be arranged so that the distance between adjacent bosses 22 increases as the diameter of the circle becomes greater. Further, the second bosses 22 may be arranged so that the distance T1 is equal to the distance T2 between the closest second bosses 22 of different circles. In addition, the second bosses 22 do not necessarily have to be arranged along a circle of which center is the axis O. That is, the second bosses 22 may be arranged in any way as long as gaps are provided between the bosses 22.

Figure 11:
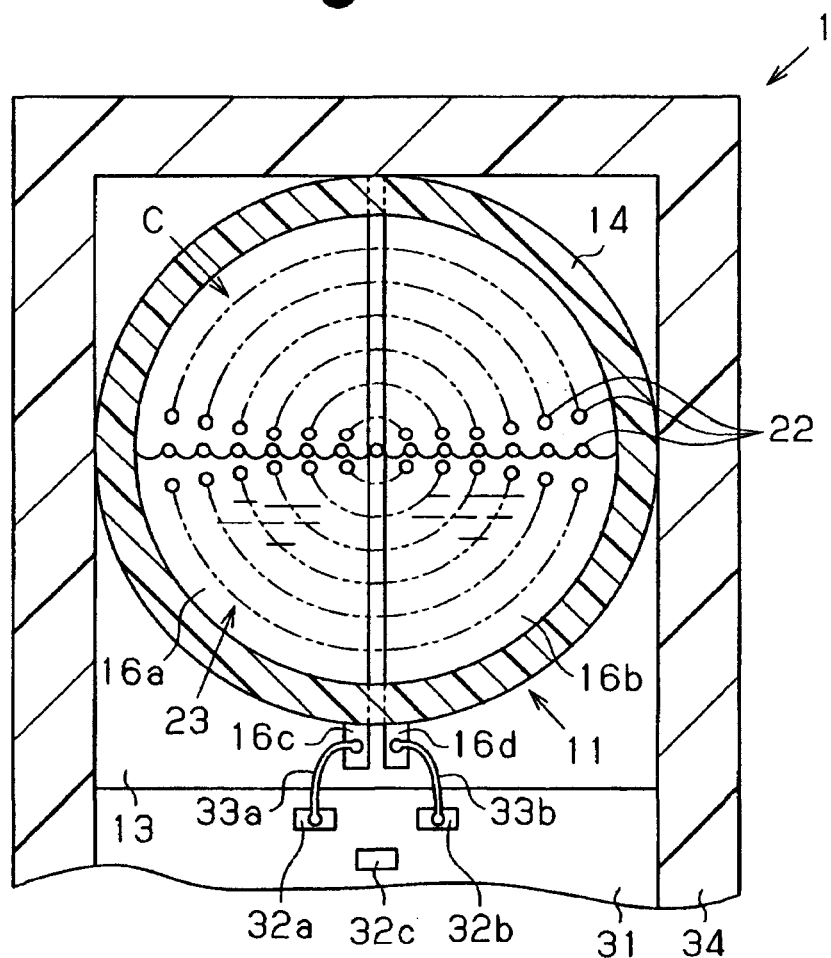
FIG. 11 is a partial cross sectional front view showing an electrostatic capacitance tilt angle sensor according to another embodiment of the present invention.

In the first embodiment, the first boss 21 arranged in the central portion of the case 11 (accommodating space C) has a greater diameter than the second bosses 22. However, as shown in FIG. 11 for example, a plurality of equally spaced second bosses 22 may be arranged in the central portion of the case 11 in place of the first boss 21. That is, all the bosses arranged in the case 11 may have the same shape and size. Alternatively, bosses of three or more different sizes may be arranged in the case 11.

In the first embodiment, the bosses 21 and 22 do not have to be cylindrical and may be polygonal.

Figure 12A:
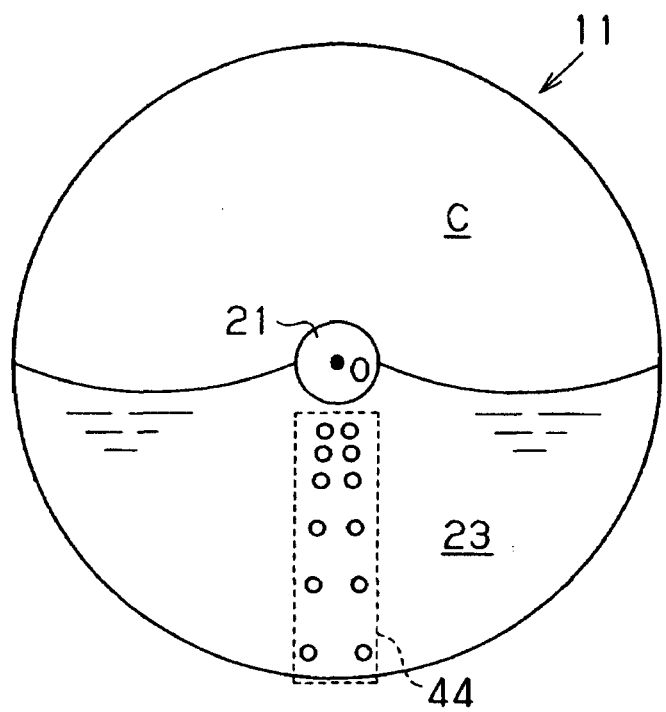
FIGS. 12A and 12B are schematic front views showing the interior of a case for an electrostatic capacitance tilt angle sensor according to a further embodiment of the present invention.

As shown in FIG. 12A, for example, in the second embodiment, the rectifying walls 41 arranged in the case 11 may be omitted. In other words, as shown in FIG. 12A, in this case, only the first boss 21 and the medium guides 44 are arranged in the case 11. In this case, the surface tension of the liquid level of the electrostatic capacitance medium 23 charged into the case 11 acts on the inner wall surface of the case 11 and the first boss 21, and thus the liquid level of the electrostatic capacitance medium 23 is substantially horizontal. When the electrostatic capacitance medium 23 is charged into the case 11, the electrostatic capacitance medium 23 is guided by the medium guides 44 and reliably reaches the first boss 21. This avoids the problem shown in FIG. 5 in which the electrostatic capacitance medium 23 does not reach the axis O. Thus, in the structure of FIG. 12A, the tilt angle sensor 1 has a simple and compact structure without lowering the tilt angle detection capacity.

Figure 12B:
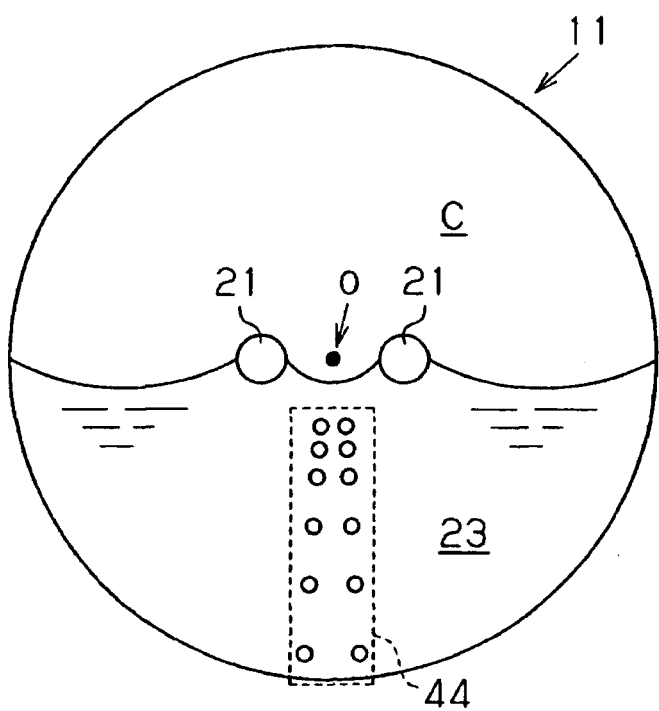

The first boss 21 does not necessarily have to be arranged on the axis O of the case 11. For instance, as shown in FIG. 12B, a plurality of (two in FIG. 12B) first bosses 21 may be arranged in the vicinity of the axis O of the case 11. This would also keep the liquid level of the electrostatic capacitance medium 23 substantially horizontal. Thus, the size of the tilt angle sensor 1 may be reduced without lowering the tilt angle detection capacity.

In the second embodiment, the medium guides 44 are arranged along two rows. However, the medium guides 44 do not have to be arranged in two rows and may be arranged in, for example, three or four rows.

In the second embodiment, the medium guides 44 may be omitted. Further, the medium guides 44 and the rectifying wall 41 may be omitted.

In the second embodiment, the medium guides 44 do not have to be cylindrical and may be, for example, polygonal.

The medium guides 44 of the second embodiment may be arranged in the case 11 for the tilt angle sensor 1 of the first embodiment.

The tilt angle sensor 1 of the first embodiment includes the electrostatic capacitance medium 23, which contains fine particles 23b, and the bosses 21 and 22. However, the tilt angle sensor 1 may include the electrostatic capacitance medium 23, which contains fine particles 23b, and only either one of the bosses 21 and 22. The tilt angle sensor 1 of the second embodiment may include, in addition to the electrostatic capacitance medium 23 containing fine particles 23b, only one of the first boss 21, the rectifying walls 41, and the medium guides 44. In such structures, the size of the tilt angle sensor 1 may also be reduced without lowering the detection capacity.

In each of the above embodiments, the diameter of the fine particles 23b is not limited to several tens of nanometers and may be of any size as long as the Brownian motion is enabled in the base 23a. The diameter of the fine particles 23b may be in the scale of nanometers in the range of, for example, several nanometers to several hundred nanometers or in the scale of micrometers, for example, several micrometers.

In each of the above embodiments, the base 23a of the electrostatic capacitance medium 23 is not limited to silicon oil and may be a liquid having a dielectric constant $\epsilon a$ between about 20 to 30, for example, a liquid organic compound, such as acetone, ethanol, methanol, and the like. The fine particles 23b are not limited to barium titanate, and may be, for example, alumina (dielectric constant: 8.9) or zirconia (dielectric constant: 50). The electrostatic capacitance medium 23 may include any combination of the above substances. For instance, if silicon oil is used as the base 23a, alumina is used as the fine particle 23b, and the mix ratio of the fine particles 23b with respect to the base 23a is 8%, the dielectric constant $\epsilon c$ of the electrostatic capacitance medium 23 is 3.1. That is, compared to a case in which the electrostatic capacitance medium 23 contains only the base 23a, the dielectric constant $\epsilon c$ is higher by about 15%. This also easily ensures that the dielectric constant of the electrostatic capacitance medium is high.

Changes in the property change of silicon oil with respect to temperature change are smaller than a liquid organic compound. Thus, when the tilt angle sensor 1 is used in a high temperature atmosphere such as, for example, when the tilt angle sensor 1 is installed in a vehicle, the use of silicon oil as the base 23a is more suitable. The mix ratio of the fine particle 23b with respect to the base 23a is preferably between about 5% and 15% and more preferably between 10% and 15%.

In each of the above embodiments, the common electrodes 15a and 15b and the differential electrodes 16a and 16b have a semicircular shape. However, they may have any shape, such as a rectangular shape.

In each of the above embodiments, the semicircular common electrodes 15a and 15b and the semicircular differential electrodes 16a and 16b form the first capacitor and the second capacitor. Instead, a circular common electrode and the semicircular differential electrode 16a and 16b may be used to form each capacitor.

In each of the above embodiments, the first boss 21, the second bosses 22, the rectifying walls 41, the medium guides 44, the third bosses 45, and the fourth bosses 46 do not necessarily have to be connected to the opposing inner wall surfaces of the case 11. That is, the first boss 21, the second bosses 22, the rectifying walls 41, the medium guides 44, the third bosses 45, and the fourth bosses 46 may be connected to only one of the opposing inner wall surfaces of the case 11.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A sensor for detecting tilt angle, the sensor comprising:
   a case including a first wall and a second wall facing each other;
   a common electrode arranged on the first wall;
   a differential electrode arranged on the second wall; and
   a liquid electrostatic capacitance medium accommodated in the case and contacting the common electrode and the differential electrode, wherein the electrostatic capacitance medium includes an insulative liquid base and fine particles that are mixed in the base and have a higher dielectric constant than the base.

2. The sensor as claimed in claim 1, wherein the fine particles have a size that is sufficient for Brownian motion to occur in the base.

3. The sensor as claimed in claim 1, wherein a mix ratio of the fine particles with respect to the base is between 5% and 15%.

4. The sensor as claimed in claim 1, wherein the case includes a central portion, the sensor further comprising:
   a projection arranged on at least either one of the common electrode and the differential electrode in at least the vicinity of the central portion of the case.

5. The sensor as claimed in claim 1 further comprising:
a plurality of bosses spaced from one another by a predetermined interval and arranged between the common electrode and the differential electrode.

6. The sensor as claimed in claim 1 further comprising:
a plurality of bosses spaced from one another by a predetermined interval and arranged on at least one of the common electrode and the differential electrode.

7. The sensor as claimed in claim 6, wherein the bosses are arranged at predetermined positions on concentric circles having different diameters.

8. The sensor as claimed in claim 1, wherein the case includes a central portion, the sensor further comprising:
a port, arranged on the case, for charging the electrostatic capacitance medium; and
a plurality of medium guides, arranged between the port and the central portion of the case on at least one of the common electrode and the differential electrode, for guiding the electrostatic capacitance medium.

9. The sensor as claimed in claim 8, wherein distance between adjacent medium guides decreases from the charge port towards the central portion of the case.

10. A sensor for detecting tilt angle, the sensor comprising:
a case including a first wall and a second wall, which face each other, and a central portion;
a common electrode arranged on the first wall;
a differential electrode arranged on the second wall;
a liquid electrostatic capacitance medium accommodated in the case and contacting the common electrode and the differential electrode; and
a projection arranged on at least one of the common electrode and the differential electrode in at least the vicinity of the central portion of the case.

11. The sensor as claimed in claim 10, wherein the projection includes a boss arranged in the vicinity of the central portion of the case and a plurality of third walls arranged along at least part of a plurality of concentric circles having different diameters.

12. The sensor as claimed in claim 10, wherein the projection is cylindrical.

13. The sensor as claimed in claim 10, further comprising:
a port, arranged on the case, for charging the electrostatic capacitance medium, wherein the projection is one of a plurality of medium guides, arranged between the port and the central portion of the case on at least either one of the common electrode and the differential electrode, for guiding the electrostatic capacitance medium.

14. The sensor as claimed in claim 13, wherein distance between adjacent medium guides decreases from the charge port towards the central portion of the case.

15. A sensor for detecting tilt angle, the sensor comprising:
a case including a first wall and a second wall facing each other;
a common electrode arranged on the first wall;
a differential electrode arranged on the second wall;
a liquid electrostatic capacitance medium accommodated in the case and contacting the common electrode and the differential electrode; and
a plurality of bosses spaced from one another by a predetermined interval and arranged between the common electrode and the differential electrode.

16. The sensor as claimed in claim 15, wherein the bosses are arranged at predetermined positions on concentric circles having different diameters.

17. The sensor as claimed in claim 16, wherein the bosses are arranged along a line extending through the center of the case.

18. The sensor as claimed in claim 17, wherein the case includes a central portion, the sensor further comprising:
a port, arranged on the case, for charging the electrostatic capacitance medium; and
a plurality of medium guides, arranged between the port and the central portion of the case on at least one of the common electrode and the differential electrode, for guiding the electrostatic capacitance medium.

19. The sensor as claimed in claim 18, wherein distance between adjacent medium guides decreases from the charge port towards the central portion of the case.

20. A sensor for detecting tilt angle, the sensor comprising:
a case including a first wall and a second wall, which face each other, and a central portion;
a common electrode arranged on the first wall;
a differential electrode arranged on the second wall;
a liquid electrostatic capacitance medium accommodated in the case and contacting the common electrode and the differential electrode;
a cylindrical first boss arranged in the central portion of the case; and
a plurality of second bosses arranged symmetrically with respect to the center of the case about the first boss.

* * * * *